(12) United States Patent
Smrha et al.

(10) Patent No.: US 7,620,288 B2
(45) Date of Patent: Nov. 17, 2009

(54) SPLICE TRAY ARRANGEMENT

(75) Inventors: Mark Smrha, Burnsville, MN (US); Chad Sjodin, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/290,234

(22) Filed: Oct. 28, 2008

(65) Prior Publication Data

US 2009/0136195 A1    May 28, 2009

Related U.S. Application Data

(62) Division of application No. 11/729,744, filed on Mar. 29, 2007, now Pat. No. 7,457,504, which is a division of application No. 11/292,782, filed on Dec. 2, 2005, now Pat. No. 7,274,852.

(51) Int. Cl.
  *G02B 6/00*   (2006.01)
(52) U.S. Cl. ........................ 385/135; 385/134
(58) Field of Classification Search ................. 385/134, 385/135
  See application file for complete search history.

(56) References Cited

U.S. PATENT DOCUMENTS

| | | | |
|---|---|---|---|
| 3,907,145 A | 9/1975 | Horvath | |
| 4,840,449 A | 6/1989 | Ghandeharizadeh | |
| 4,900,123 A | 2/1990 | Barlow et al. | |
| 5,074,635 A | 12/1991 | Justice et al. | |
| 5,115,489 A | 5/1992 | Norris | |
| 5,119,459 A | 6/1992 | Meyerhoefer et al. | |
| 5,185,845 A | 2/1993 | Jones | |
| 5,189,725 A | 2/1993 | Bensel, III et al. | |
| 5,222,184 A | 6/1993 | Foss | |
| 5,323,480 A | 6/1994 | Mullaney et al. | |
| 5,420,956 A | 5/1995 | Grugel et al. | |
| 5,450,518 A | 9/1995 | Burek et al. | |
| 5,490,229 A | 2/1996 | Ghandeharizadeh et al. | |
| 5,519,804 A | 5/1996 | Burek et al. | |
| 5,548,678 A | 8/1996 | Frost et al. | |

(Continued)

FOREIGN PATENT DOCUMENTS

EP    1 050 765 A1    11/2000

(Continued)

OTHER PUBLICATIONS

Photo of splice tray and cover, and photo of opened splice tray, manufactured by 3M of St. Paul, Minnesota, 2 pages (publicly known prior to the filing date of the present application).

(Continued)

*Primary Examiner*—Uyen Chau N Le
*Assistant Examiner*—Rhonda S Peace
(74) *Attorney, Agent, or Firm*—Merchant & Gould P.C.

(57) ABSTRACT

A splice tray arranged to manage and store both stranded fiber optic cables and ribbon fiber optic cables. The tray includes a splice holding arrangement that accommodates both stranded splice components and ribbon splice components. The tray also includes a storage arrangement having radius limiting arrangements that define a number of storage or routing pathways that accommodate varying lengths of both stranded fiber optic cables and ribbon fiber optic cables.

8 Claims, 9 Drawing Sheets

U.S. PATENT DOCUMENTS

| | | | |
|---|---|---|---|
| 5,553,183 | A | 9/1996 | Bechamps |
| 5,553,186 | A | 9/1996 | Allen |
| 5,572,617 | A | 11/1996 | Bernhardt et al. |
| 5,577,151 | A | 11/1996 | Hoffer |
| 5,590,234 | A | 12/1996 | Pulido |
| 5,647,045 | A | 7/1997 | Robinson et al. |
| 5,689,605 | A | 11/1997 | Cobb et al. |
| 5,790,741 | A | 8/1998 | Vincent et al. |
| 5,801,237 | A | 9/1998 | Johansson |
| 5,802,237 | A | 9/1998 | Pulido |
| 5,825,962 | A | 10/1998 | Walters et al. |
| 5,835,657 | A | 11/1998 | Suarez et al. |
| 5,870,519 | A | 2/1999 | Jenkins et al. |
| 5,892,877 | A | 4/1999 | Meyerhoefer |
| 5,896,486 | A | 4/1999 | Burek et al. |
| 5,917,984 | A | 6/1999 | Röseler et al. |
| 6,009,225 | A | 12/1999 | Ray et al. |
| 6,144,792 | A | 11/2000 | Kim et al. |
| 6,192,180 | B1 | 2/2001 | Kim et al. |
| 6,215,938 | B1 | 4/2001 | Reitmeier et al. |
| 6,226,436 | B1 | 5/2001 | Daoud et al. |
| 6,249,635 | B1 | 6/2001 | Daoud |
| 6,249,636 | B1 | 6/2001 | Daoud |
| 6,259,851 | B1 | 7/2001 | Daoud |
| 6,285,815 | B1 | 9/2001 | Daoud |
| 6,427,045 | B1 | 7/2002 | Matthes et al. |
| 6,456,772 | B1 | 9/2002 | Daoud |
| 6,504,989 | B1 | 1/2003 | Gooding |
| 6,512,876 | B2 | 1/2003 | Daoud |
| 6,567,601 | B2 | 5/2003 | Daoud et al. |
| 6,580,866 | B2 | 6/2003 | Daoud et al. |
| 6,687,450 | B1 | 2/2004 | Kempeneers et al. |
| 6,701,056 | B2 | 3/2004 | Burek et al. |
| 6,744,962 | B2 | 6/2004 | Allerellie |
| 6,788,871 | B2 | 9/2004 | Taylor |
| 6,798,966 | B2 | 9/2004 | Loh |
| 6,801,704 | B1 | 10/2004 | Daoud et al. |
| 6,845,207 | B2 | 1/2005 | Schray |
| 7,274,852 | B1 | 9/2007 | Smrha et al. |
| 7,457,504 | B2 | 11/2008 | Smrha et al. |
| 2002/0118944 | A1 | 8/2002 | Burns et al. |
| 2003/0091315 | A1 | 5/2003 | Allerellie |
| 2004/0240825 | A1 | 12/2004 | Daoud et al. |
| 2006/0098931 | A1 | 5/2006 | Sibley et al. |
| 2006/0215980 | A1* | 9/2006 | Bayazit et al. ............. 385/135 |

FOREIGN PATENT DOCUMENTS

| | | |
|---|---|---|
| GB | 2 367 378 | 3/2002 |
| GB | 2 368 136 A | 4/2002 |
| WO | WO 96/38752 | 12/1996 |
| WO | WO 02/19005 A2 | 3/2002 |

OTHER PUBLICATIONS

Photo of splice tray manufactured by ADC Telecommunications, Inc. of Eden Prairie, Minnesota, 1 page (publicly known prior to the filing date of the present application).

Photo of splice tray manufactured by Preformed Line Products of Cleveland, Ohio, 1 page (publicly known prior to the filing date of the present application).

Splice Tray Kits, http://www.levitonvoicedata.com/catalog/BuildPage.aspx?BuildPageID=141, 2 pages (Copyright 2001-2004; publicly known prior to the filing date of the present application).

Patching Splitter Tray, http://splitter.telecomosp.com/fiber1.cfm?Polybrands=fibcon-fibmanage-copnid-KR-310, 4 pages (publicly known prior to the filing date of the present application).

Preformed Line Products. Splice Closures—Splice Cases, http://www.newtechindustries.com/newtech/preformed_line_products/splice_closures.htm, 3 pages (Jan. 27, 2005; publicly known prior to the filing date of the present application).

Fiber Optics Fiber Apparatus Closures Accessories Trays, http://www.arrisistore.com/subcat.php?cat=EBACA&PHPSESSID=0a6023c3ce561b7d9, 8 pages (publicly known prior to the filing date of the present application).

3M FibrDome Closure Instructions, pp. 1-36 (Aug. 1995).

Splice Trays. A LANscape® Solutions Product. Corning Cable Systems, 6 pages (publicly known prior to the filing date of the present application).

Splice-through Fiber Trays, http://www.hubersuhner.com/products/hs-p-fo/hs-p-fo-inst/hs-p-fo-inst-lisa/hs-p-fo-inst-, 1 page (publicly known prior to the filing date of the present application).

U.S. Appl. No. 11/089,437, filed Mar. 24, 2005.

* cited by examiner

SPLICE TRAY ARRANGEMENT

CROSS-REFERENCE TO RELATED APPLICATIONS

This application is a divisional of U.S. application Ser. No. 11/729,744, filed Mar. 29, 2007; now U.S. Pat. No. 7,457,504 which is a divisional of U.S. application Ser. No. 11/292,782, filed Dec. 2, 2005, now U.S. Pat. No. 7,274,852; which applications are incorporated herein by reference.

TECHNICAL FIELD

This disclosure relates generally to devices used in the telecommunications industry. More particularly, this disclosure relates to a splice tray used for managing and storing fiber optic cables.

BACKGROUND

A wide variety of telecommunication applications utilize fiber optic cables, and in turn involve fiber optic cable splicing and fiber optic cable storage. In these applications, care must be taken to avoid unnecessary or excessive bending of the cables. Bending of fiber optic cables can, for example, cause attenuation, loss of signal strength, and sometimes complete loss of signal transmission through the fiber.

Splice trays are often used to organize and manage fiber optic cables. A splice tray typically holds a number of fiber optic cables. Generally, there are two types of fiber optic cables: stranded cable and ribbon cable. Stranded cable has a single fiber optic surrounded by an insulator. Ribbon cable has multiple fiber optics surrounded by a matrix and arranged side-by-side in a flat ribbon-like construction.

Stranded cable is generally circular in cross-section and is relatively small in size (typically about 900 microns in diameter). Because of the small size and configuration of stranded cables, a generous extra amount of each of the stranded cables of a splice tray can be stored around spools in the splice tray. The extra amount of cable, or slack cable, is often provided in the event a portion of the cable needs to be replaced or repaired, for example.

When utilizing slack stranded cable, the needed amount of slack cable is simply un-wound or removed from the spool, the repair completed, and the remaining slack cable re-wound around the spool. Because of the number of other stranded cables in the splice tray, the slack cable of each of the stranded cables most likely crosses over other cables as slack cable is utilized. While a neatly organized and managed cable arrangement is preferred, the relative small size and configuration of stranded cable does permit the cables to cross over one another when stored around spools in the splice tray.

Extra slack ribbon cable of a ribbon cable splice tray, however, cannot be utilized and stored as simply and easily as stranded cable. The flat ribbon-like construction of ribbon cable generally has a width of 0.125 inches. Because of the width of the flat ribbon cable, ribbon cables cannot cross-over one another, as the combined height of the ribbon cables exceeds the maximum storage height of splice trays.

In general, improvements to conventional arrangements for managing and storing both spliced fiber optic stranded cables and spliced fiber optic ribbon cable are desired.

SUMMARY

Features of the present disclosure relate to a splice tray arranged to manage and store both stranded fiber optic cables and ribbon fiber optic cables. The tray includes a splice holding arrangement that accommodates both stranded splice components and ribbon splice components. The tray also includes a storage arrangement having radius limiting elements that define a number of storage and routing pathways. The splice tray may further include routing information formed in the tray to eliminate the need for a separate schematic diagram.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 1:
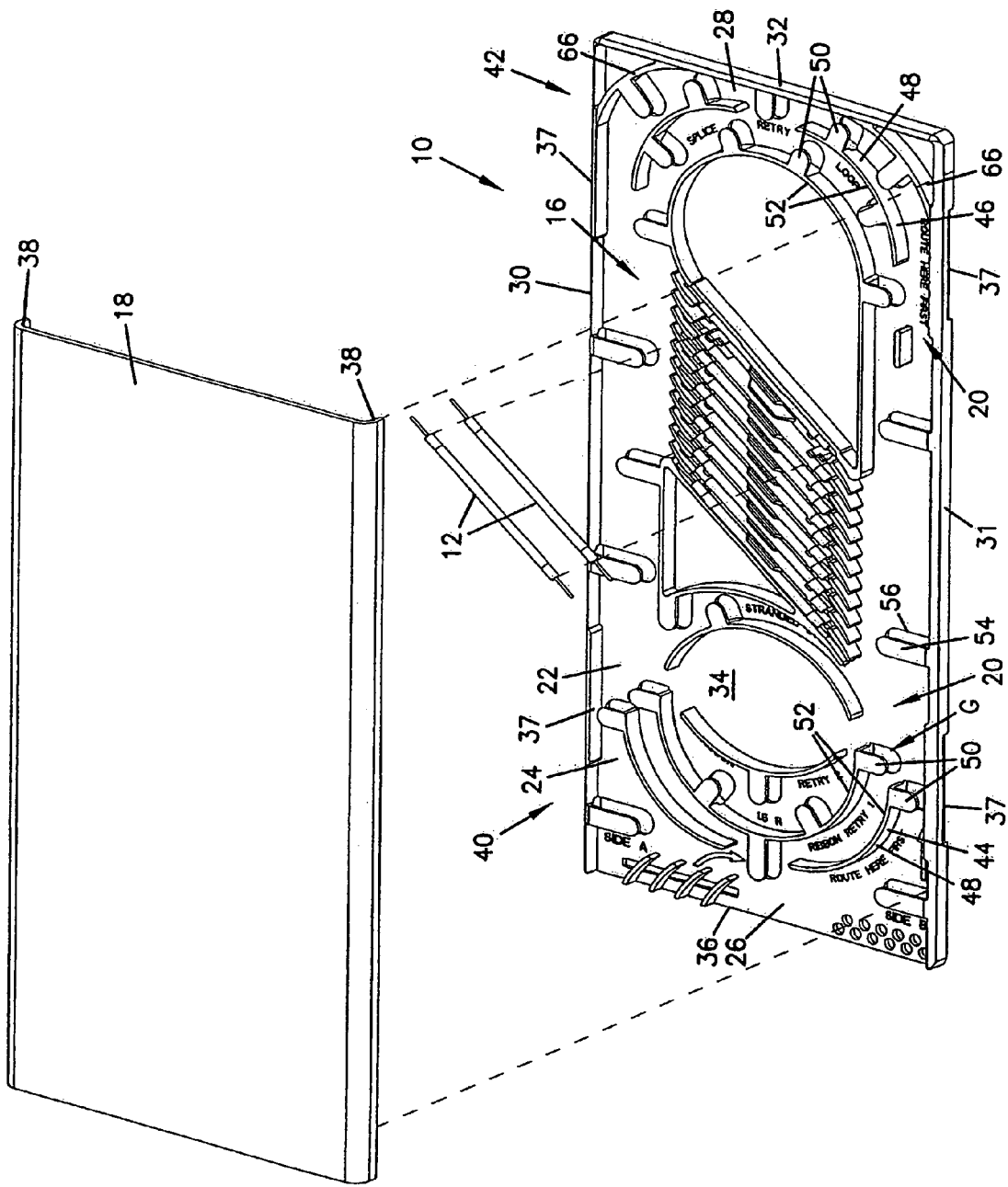
FIG. 1 is an exploded perspective view of one embodiment of a splice tray, according to the principles of the present disclosure, shown in use with stranded cable splice components.
Figure 2:
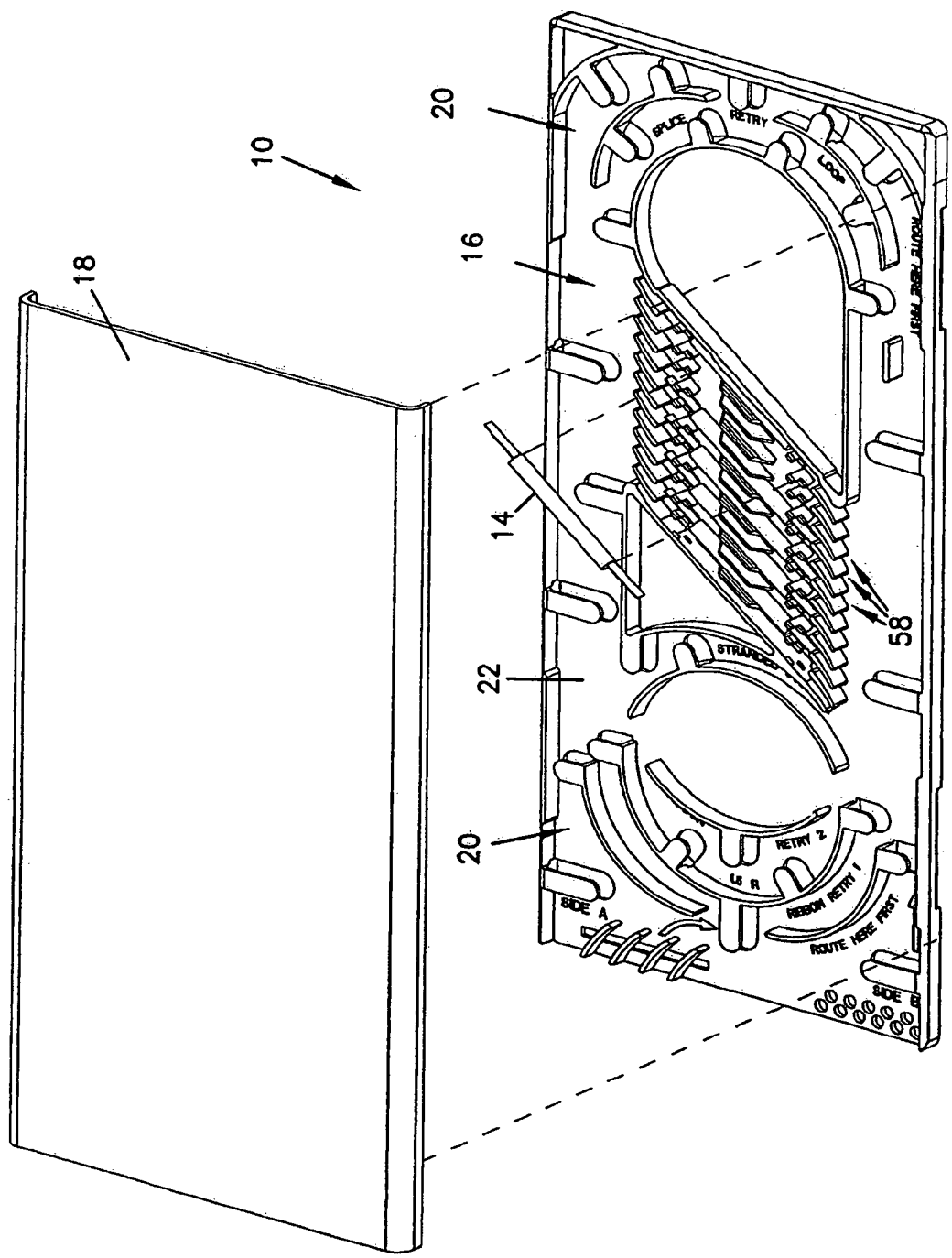
FIG. 2 is an exploded perspective view of the splice tray of FIG. 1, shown in use with ribbon cable splice components.

FIGS. 1 and 2 illustrate a splice tray 10 having features that are examples of how inventive aspects in accordance with the principles of the present disclosure may be practiced. Preferred features are adapted for promoting cable management by preventing cable attenuation due to excessive cable bending, and providing convenient storage of slack cable for either stranded cable or ribbon cable.

The splice tray 10 of the present disclosure is used to house spliced fiber optic cables. In splicing fiber optic cables, two fiber optic cables are joined or spliced together by a splice component. The splice component can include, for example, a stranded heat shrink splice component 12 (FIG. 1) used to join single-fiber cables; or a mass fusion splice component 14 (FIG. 2) used to join ribbon cables. The splice tray 10 of the present disclosure includes a splice holding arrangement 16 for holding or retaining the splice components, e.g., 12, 14.

In use, a generous portion of slack cable of each cable stored in the splice tray is often provided to permit maintenance or replacement of the splice components 12, 14 without requiring complete cable replacement. To accommodate the slack cable, the splice tray 10 of the present disclosure includes a storage arrangement 20 for storing slack cable.

Still referring to FIGS. 1 and 2, the splice tray 10 includes a base 22. The base 22 of the splice tray 10 is preferably a molded construction. The base 22 can be molded from common engineering materials including polymers such as polybutylene terephthalate (PBT), polycarbonate (PC), polyethylene ether (PPE), and polystyrene (PS), for example. In the illustrated embodiment, a cover 18 is provided. The cover 18 can be molded or manufactured from similar or different materials than that of the base 22.

The splice holding arrangement 16 of the splice tray 10 is preferably integrally formed or molded with the base 22. That is, the splice holding arrangement 16 is not attachable or detachable from the base 22; rather, the splice tray 10 is constructed such that the base 22 and the splice holding arrangement 16 are a one-piece unit.

Figure 3:
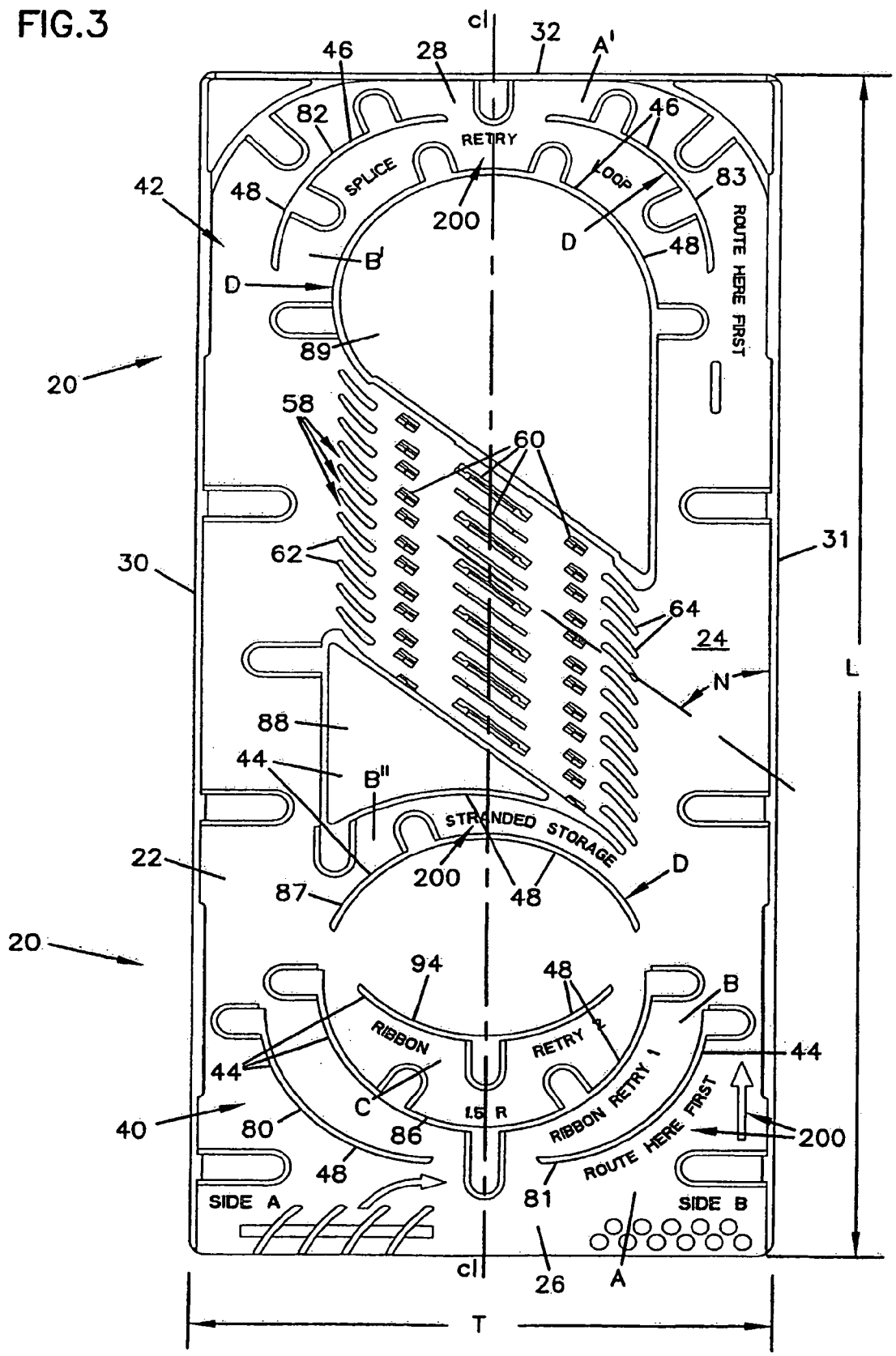
FIG. 3 is a top plan view of the splice tray of FIG. 1.

Referring still to FIG. 1, the base 22 of the splice tray 10 includes a generally planar surface 24 having a first end 26 and a second end 28. Tray sides extend outward from the planar surface 24. In the illustrated embodiment, the tray sides include two opposing sides 30, 31 and a side 32 transverse to the two opposing sides 30, 31. The transverse side 32 is located at the second end 28 of the planar surface 24 or base 22. As shown in FIG. 3, the base 22 has a generally longitudinal dimension L extending between the first end 26 and the second end 28, and a transverse dimension T extending between the two opposing sides 30, 31.

The sides 30, 31, 32 of the splice tray 10 are located along a majority of the perimeter of the planar surface 24 and at least partially define an interior 34 (FIG. 1) of the splice tray 10. An open side 36 is located at the first end 26 of the base 22 to provide access to the interior 34. The open side 36 or open end functions as a cable entry and a cable exit.

Referring to FIG. 1, at least one of the tray sides includes cover attachment structure 37. In the illustrated embodiment, the cover attachment structure 37 includes openings 37 formed in at least one of the opposing sides 30, 31 of the splice tray 10. In an alternative embodiment, the cover attachment structure 37 can be formed in the transverse side 32 located at the second end 28 of the splice tray 10. The openings 37 in the illustrated embodiment are constructed to receive mating structure (not shown), such as a rib, located on an inner surface of an edge 38 of the cover 18. The mating structure typically snap-fits within the openings 37 of the base 22 to at least partially enclose the interior 34 of the splice tray 10.

Referring now to FIG. 3, the storage arrangement 20 for storing slack cable of the splice tray 10 includes a first radius limiting arrangement 40 and a second radius limiting arrangement 42. The first radius limiting arrangement 40 is located adjacent to the first end 26 of the base 22, and the second radius limiting arrangement 42 is located adjacent to the second end 28 of the base 22. Preferably, at least one of the first and second radius limiting arrangements 40, 42 includes a plurality of radius elements that make up the particular arrangement. In the illustrated embodiment, the first radius limiting arrangement 40 includes a first plurality of radius elements 44; and the second radius limiting arrangement 42 includes a second plurality of radius elements 46.

The first and second plurality of radius elements 44, 46 of the radius limiting arrangements 40, 42 are disposed on the planar surface 24 of the splice tray 10. Preferably, each of the radius elements 44, 46 is integrally formed or molded on the base 22 of the splice tray 10. In particular, each of the radius elements 44, 46 is defined by a curved wall 48 (FIG. 1) that projects outward from the planar surface 24 of the splice tray 10. The projecting wall 48 is a molded construction formed on the planar surface 24; accordingly, the radius elements 44, 46 of the radius limiting arrangements 40, 42 are made of a similar material to that of the base 22, as previously described.

Still referring to FIG. 3, the embodiment of the radius elements 44, 46 can take on a number of shapes. For example, one of the radius elements 44 (i.e., 88) of the first radius limiting arrangement 40 is formed as a continuous structure or island, which includes the curved wall 48 that projects from the planar surface 24. Likewise, another of the radius elements 46 (i.e., 89) of the second radius limiting arrangement 42 is formed as a continuous structure or island, which includes the curved wall 48 that projects from the planar surface 24. In contrast, some of the radius elements 44, 46 (e.g., 81, 82) of the limiting arrangements 40, 42 are simply defined by only the curved wall 48. In the illustrated embodiment, a number of radius elements 44, 46 of the first and second radius limiting arrangements 40, 42 are generally positioned in a symmetrical arrangement about a centerline (cl) of the tray 10.

The radius limiting arrangements 40, 42 are constructed to limit the bend radius of cables when the cables are wrapped about the radius elements 44, 46 for storage and/or organizational purposes. In particular, the curved wall 48 of each of the radius elements 44, 46 of the limiting arrangements 40, 42 has a radius limiting diameter D of preferably no less than 3.0 inches to provide a minimum bend radius of 1.5 inches; although the disclosed principles can be applied in a variety of sizes and applications depending upon the type of cable stored, for example. Depending upon the embodiment of the radius element, the radius limiting diameter D can be an outer convex diameter or an inner concave diameter. In the illustrated embodiment, the diameters D of each of the radius elements 44, 46 are approximately the same. In other embodiments, the outer diameter of each of the radius limiters may be different from one another, but are preferably no less than 3.0 inches.

The storage arrangement 20 of the present splice tray offers a variety of storage routing schemes that accommodate varying lengths of cable. That is, the radius elements 44, 46 of the first and second radius limiting arrangements 40, 42 define a number of cable pathways that accommodate varying length of cable slack. The number of cable pathways includes an outer pathway, a first inner pathway, a second inner pathway, and a number of other pathway configurations made up from pathway segments of the storage arrangement 20.

Referring to FIG. 3, the radius elements 44, 46 of the first and second radius limiting arrangements 40, 42 include outer radius elements 80-83. The outer radius elements 80-83 define the outer pathway of the tray 10. The outer pathway is generally the outermost pathway defined between the outer radius elements 80-83 of the first and second radius limiting arrangements 44, 46, and the sides 30, 31, 32 of the tray 10. The outer pathway includes a first segment or outer cable loop A defined by the outer radius elements 80, 81 of the first radius limiting arrangement 40; and a second segment or outer cable loop A' defined by the outer radius elements 82, 83 of the second radius limiting arrangement 42.

The radius elements 44, 46 of the first and second radius limiting arrangements 40, 42 also include inner radius elements 86-89. The inner radius elements 86-89 of the radius elements 44, 46, define the first inner pathway of the splice tray 10. The first inner pathway includes first, second, and third segments or cable loops, B, B', B". The first segment B is generally defined between the outer radius elements 80, 81 and the inner radius element 86 of the first radius limiting arrangement 40. The second segment or cable loop B' is generally defined between the outer radius elements 82, 83 and the inner radius element 89 of the second radius limiting arrangement 42. The third segment or spooling loop B" is generally defined between the inner radius elements 87, 88 of the first radius limiting arrangement 40.

In addition, the radius elements 44 of the first radius limiting arrangement 40 also include an inner radius element 94. The inner radius element 94 defines the second inner pathway of the storage arrangement 20. The second inner pathway includes a segment or inner cable loop C. The segment C is generally defined between the inner radius element 86 and the inner radius element 94.

Referring back to FIG. 1, each of the radius elements 44, 46 of the radius limiting arrangements 40, 42 includes one or more tabs 50. The tabs extend transversely outward from the walls 48 of the radius elements 44, 46. As shown in FIG. 1, the tabs 50 are located adjacent to a top edge 52 of the wall 48 of each radius element so that a gap G is provided between the tab 50 and the planar surface 24 of the base 22. Cables are tucked under the tabs 50 and within the gap G during storage. The tabs 50 help to retain the cables about the radius elements 44, 46. Side tabs 54 are also formed along each of the sides 30, 31, 32 of the splice tray 10 for retaining cables within the interior 34 of the tray. In the illustrated embodiment, slots 56 are formed in the planar surface 24 opposite each of the tabs 50, 54 for manufacturing purposes.

In addition to the first and second radius limiting arrangements 40, 42, the storage arrangement 20 the present cable tray 10 further includes corner fillets 66 integrally molded as part of the base 22. The corner fillets 66 are provided to prevent cables from pushing into the corners of the splice tray 10 and bending beyond the minimum bend radius of 1.5 inches.

Referring again to FIG. 2, the splice holding arrangement 16 of the splice tray 10 is positioned between the first and second radius limiting arrangements 40, 42. The splice holding arrangement 16 includes a plurality of slots or channels 58 within which the splice components (e.g., 12, 14) are placed and held. As shown in FIG. 3, the channels 58 run parallel to one another. In the illustrated embodiment, the splice holding arrangement 16 includes twelve parallel channels 58. The channels 58 are oriented in a non-perpendicular angle N relative to the longitudinal dimension L of the base 22. In the illustrated embodiment, the channels 58 are diagonally oriented relative to the longitudinal and transverse dimensions of the base 22.

The channels 58 of the splice holding arrangement 16 are defined by retaining structure 60. As previously described, the splice holding arrangement 16, and accordingly, the retaining structure 60 are integrally molded or formed on the planar surface 24 of the splice tray 10. The channels 58 are also defined by curved fingers 62, 64 located at opposite ends of the retaining structure 60 of the splice holding arrangement 16. The curved fingers 62, 64 are also integrally molded or formed on the planar surface 24 of the splice tray 10. Therefore, the retaining structure 60 and the fingers 62, 64 are made of a similar material to that of the base 22 of the splice tray, as previously described.

The retaining structure 60 of the splice holding arrangement 16 is preferably designed to retain and hold two types of splice components; i.e., the stranded heat shrink splice components 12 (stranded splice component) and the mass fusion splice components 14 (ribbon splice component). One example of a retaining structure arrangement that can be employed for holding the two types of splice components is disclosed in commonly assigned application Ser. No. 11/089,437, which application is incorporated herein by reference.

Preferably, the retaining structure 60 of the splice holding arrangement 16 is designed to hold up to twenty-four stranded splice components 12 (two in each channel 58), or up to six ribbon splice components 14.

The splice holding arrangement 16 therefore can be used to house either fiber optic ribbon cables or fiber optic stranded cables. In use, each type of cable includes a first incoming cable length joined to a second outgoing cable length by a splice component. While referred to as incoming and outgoing cable lengths, it will be appreciated that the terms incoming and outgoing are used for explanatory purposes of the illustrated embodiment and that the nomenclature may be conversely assigned.

Figure 4:
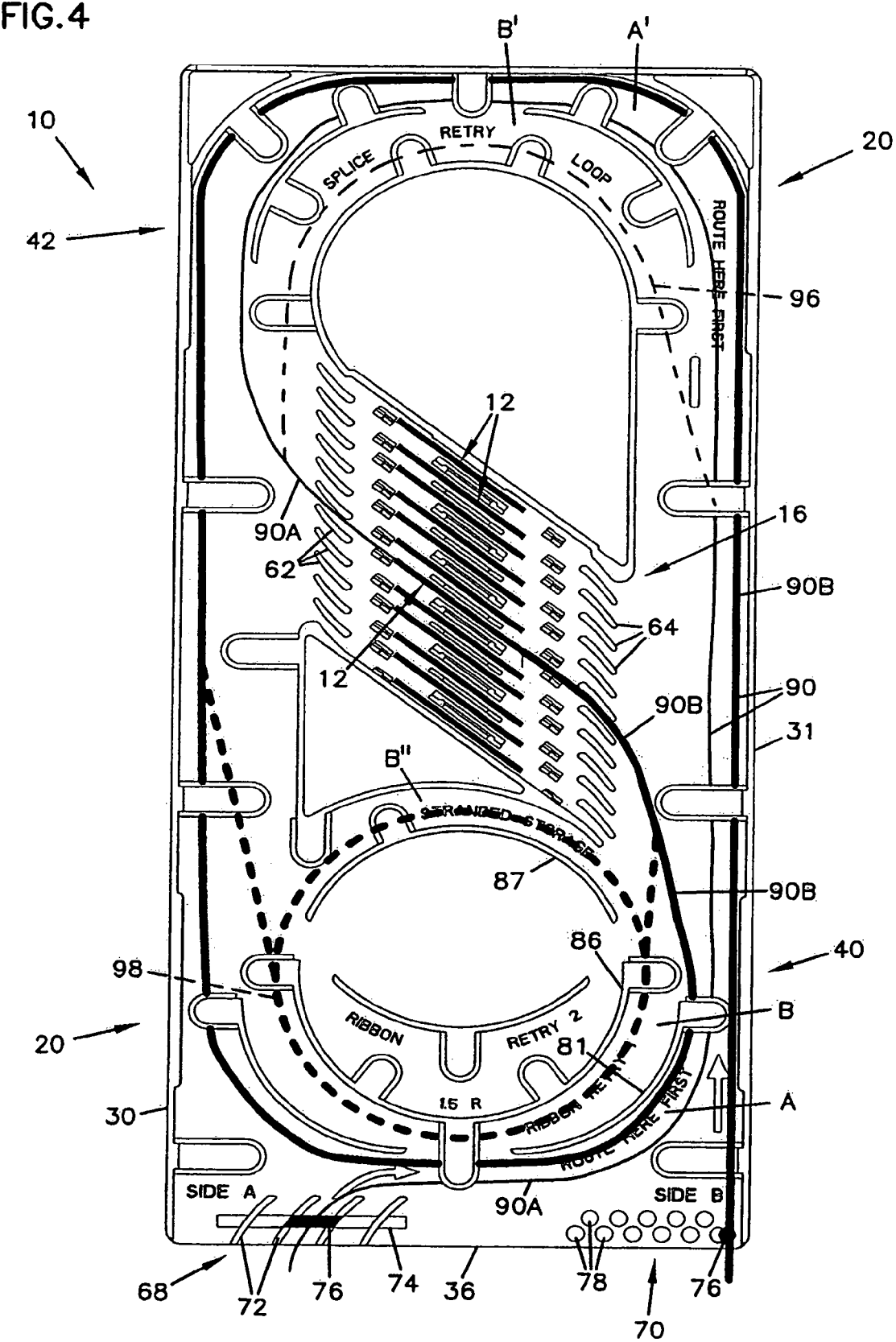
FIG. 4 is a top plan view of the splice tray of FIG. 3, showing various routing schemes of stranded cable.

FIG. 4 illustrates the splice tray 10 in use with fiber optic stranded cables 90. For purposes of clarity, only one stranded cable 90 is shown, although the splice holding arrangement 16 is designed to hold twenty-four stranded splice components 12 and cables 90. The stranded cable 90 enters and exits through the open side 36 or open end of the splice tray 10. In particular, a first incoming length or portion 90A (represented by a bold, thin line) of the stranded cable 90 enters at an entrance location 68 located at the open end of the splice tray 10. A second outgoing length or portion 90B (represented by a bold, thick line) of the stranded cable exits at an exit location 70 at the open end of the tray. Again, while referred to as entrance and exit locations, it will be appreciated that the terms entrance and exit are used for explanatory purposes of the illustrated embodiment and that the nomenclature may be conversely assigned.

Still referring to FIG. 4, the entrance location 68 can include a number of guides 72 for organizing the incoming cables lengths 90A. Because the incoming cable lengths 90A enter adjacent one side 30 of the splice tray and are then routed toward the opposite side 31 of the tray, as will be described in greater detail hereinafter, the guides 72 are curved to prevent the cables from exceeding a minimum bend radius of 1.5 inches.

To manage the organization of cables entering and exiting the splice tray 10, the stranded cables 90 can be fixed at the particular entering and exiting locations 68, 70 of the base 22. For example, a slot 74 is provided at the entrance location 68 of the splice tray 10. A lancing, tie, or other securing device 76 can be placed through the slot 74 and around the guide(s) 72 to tie or secure the cables 90 at the entrance location 68. Likewise, apertures 78 are provided adjacent to the exit location 70 of the splice tray 10 to receive a tie 76 for securing the cables 90 at the exit location 70.

When organizing or filling the splice tray 10 with stranded cables 90, the incoming cable length 90A of each of the cables 90 enters at the entrance location 68 and is routed through the first and second radius limiting arrangements 40, 42 in a counter-clockwise direction. In particular, the cable length 90A is routed around the outer radius element 81 (i.e, within a portion of the first segment A of the outer pathway) of the first radius limiting arrangement 40 in a counter-clockwise direction. The cable length 90A then runs within the outer pathway adjacent to the side 31 of the splice tray 10 and through the second segment A' of the outer pathway.

From the second segment A' of the outer pathway, the first incoming cable length 90A is fed through the curved fingers 62 and into one of the channels 58 of the splice holding arrangement 16. A stranded splice component 12 is used to join the first incoming cable length 90A and the second outgoing cable length 90B to provide a connection therebetween.

The second outgoing cable length 90B exits the curved fingers 64 of the splice holding arrangement 16 and is routed through the first and second radius limiting arrangements 40, 42 in a clockwise direction. Depending upon the amount of slack desired, the outgoing cable length 90B can be routed through either the first segment A of the outer pathway or through the first segment B of the first inner pathway.

In the illustrated routing scheme of FIG. 4, the outgoing stranded cable length 90B is routed from the splice holding arrangement 16 to the first segment A of the outer pathway of the first radius limiting arrangement 40, and then directly to the second segment A' of the outer pathway of the second radius limiting arrangement 42. From the second segment A' of the outer pathway, the stranded cable 90 is routed along the side 31 of the tray 10, and exits the tray at the exit location 70. As shown in FIG. 4, the outgoing stranded cable length 90B is routed both inside the incoming stranded cable length 90A when coming from the splice holding arrangement 16, and outside of the incoming stranded cable length 90A when coming from the second outer pathway segment A', without crossing over the incoming cable length 90A. This routing scheme keeps the incoming and outgoing lengths 90A, 90B neatly separated and organized.

In the alternative, the outgoing stranded cable length 90B can be routed from the splice holding arrangement 16 to the first segment B of the first inner pathway (as represented by dashed lines). From the first segment B of the first inner pathway, the stranded cable 90 can be routed through the third segment B" of the radius limiting arrangement 40. The third segment B" is referred to as the stranded storage segment. The radius element 87 that partially defines the stranded storage segment B" is located in relation to radius element 86 to provide a circular spooling structure. The spooling structure defines a spooling pathway.

The spooling pathway (segments B, B") is located only at one side of the tray, i.e., defined by only the first radius limiting arrangement 40, as opposed to being defined by both first and second limiting arrangements 40, 42 (as is the outer pathway, for example). The outgoing stranded cable length 90B can be wrapped around the spooling structure a desired number of times to store extra cable slack. From this spooling pathway (segments B, B"), the outgoing cable length 90B is then routed through the second segment A' of the outer pathway in the clockwise direction. From the second segment A' of the outer pathway, the outgoing cable length 90B is routed along the side 31 of the splice tray 10 to exit the splice tray at the exit location 70, as previously described.

Extra cable slack is typically used in circumstances where the splice component (e.g., 12) of the cable requires replacement, such as when the splice connection fails or does not properly established a connection between the incoming and outgoing cable lengths. With stranded cable 90, the disclosed splice tray arrangement permits the technician to simply remove one or more loops of slack cable from the radius elements, utilize the extra cable slack to re-splice the cable, and return the un-used slack length to the storage arrangement 20.

Because of the different lengths of each of the various pathways of the storage arrangement 20, the un-used slack length can be neatly returned to storage. For example, if it is desirable to utilize a slack portion of the incoming cable length 90A, the cable length or loop 90A can be removed from the second segment A' of the outer pathway, a portion of the cable loop 90A used in the repair, and the remaining cable loop (now shorted) returned to the shorter inner pathway, i.e., segment B' (represented by thin dashed line 96). In the alternative, if it is desirable to utilize a portion of the outgoing cable length 90B, the cable length or loop 90B can be removed from the first segment A of the outer pathway (or from the spooling pathway B, B"), a portion of the cable loop 90B used in the repair, and the remaining cable loop (now shorted) returned to the inner or spooling pathway, i.e., segment B and/or B" (represented by thick dashed line 98).

As can be understood, this arrangement accommodates numerous cable storage routing schemes that can be used to neatly store and provide convenient access to slack stranded cable 90. When utilizing the slack stranded cable, the needed amount of stranded cable 90 is simply un-wound from the radius elements, utilized, and easily returned to a selected cable pathway. Because of the size and configuration of stranded cables 90, stranded cables are permitted to cross over one another when removed from and replaced within the storage arrangement 20. Accordingly, when repairing one particular stranded splice component 12, for example, it is not necessary to remove and re-route any of the other cables 90 in the splice tray. The repaired stranded cable can be simply removed from a cable pathway and returned to the selected cable pathway that best accommodates the shortened length of the cable.

As previously discussed, however, slack ribbon cable cannot be stored as simply and easily as stranded cable 90. Because of the flat construction of ribbon cable, ribbon cables cannot cross over one another, as the combined height of the ribbon cables typically exceeds the maximum height of the splice tray. Conventional splice trays are accordingly more difficult to use in ribbon cable applications, as replacement of a ribbon splice component, for example, can often require the technician to re-route all incoming and outgoing cable portions of the splice tray. The storage arrangement 20 of the present splice tray 10 is designed to not only provide greater adaptability and functionality in the routing schematic of stranded cable 90, but also permits slack ribbon cable to be easily accessed and utilized without re-routing the entire splice tray.

Figure 5:
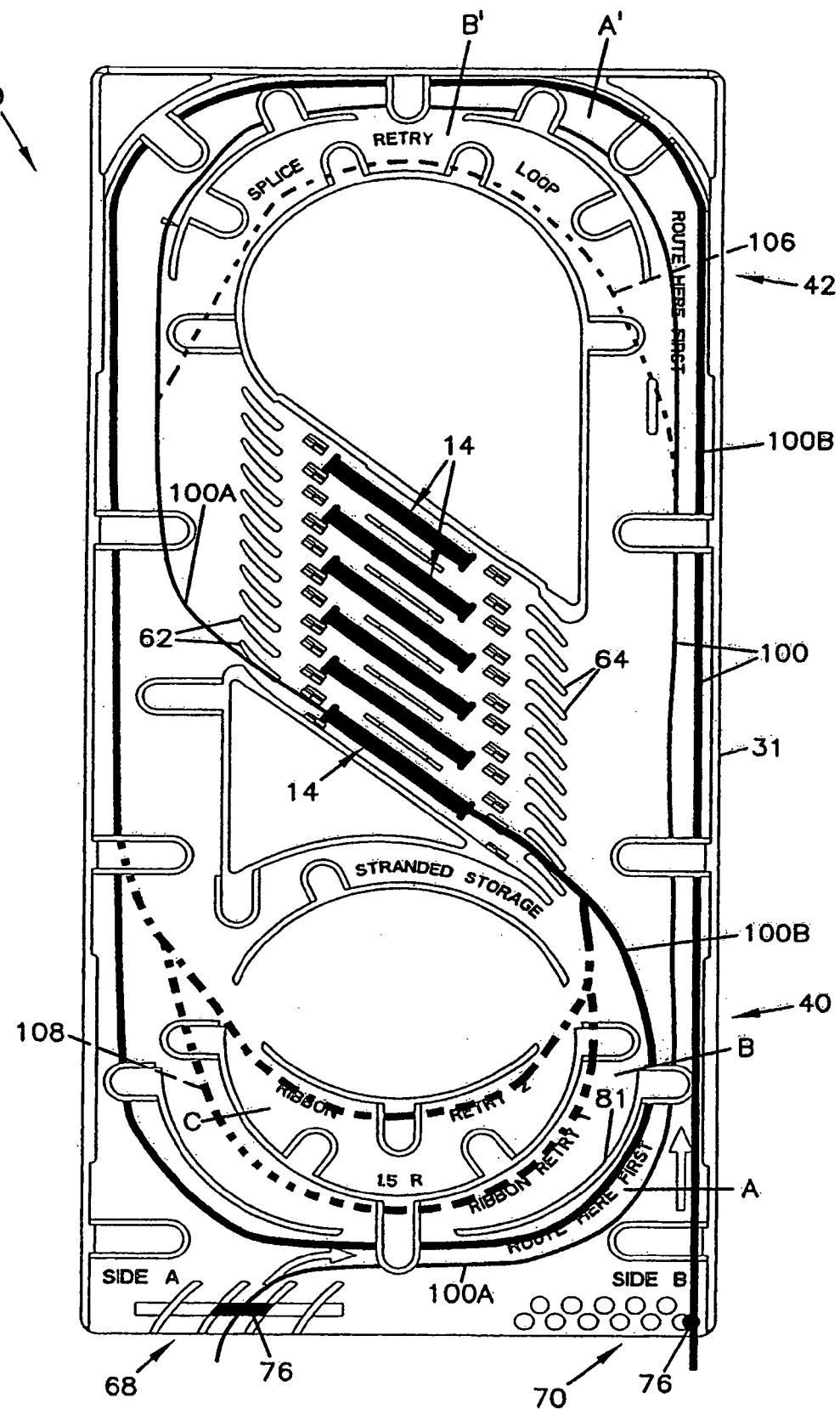
FIG. 5 is a top plan view of the splice tray of FIG. 3, showing various routing schemes of ribbon cable.
Figure 9:
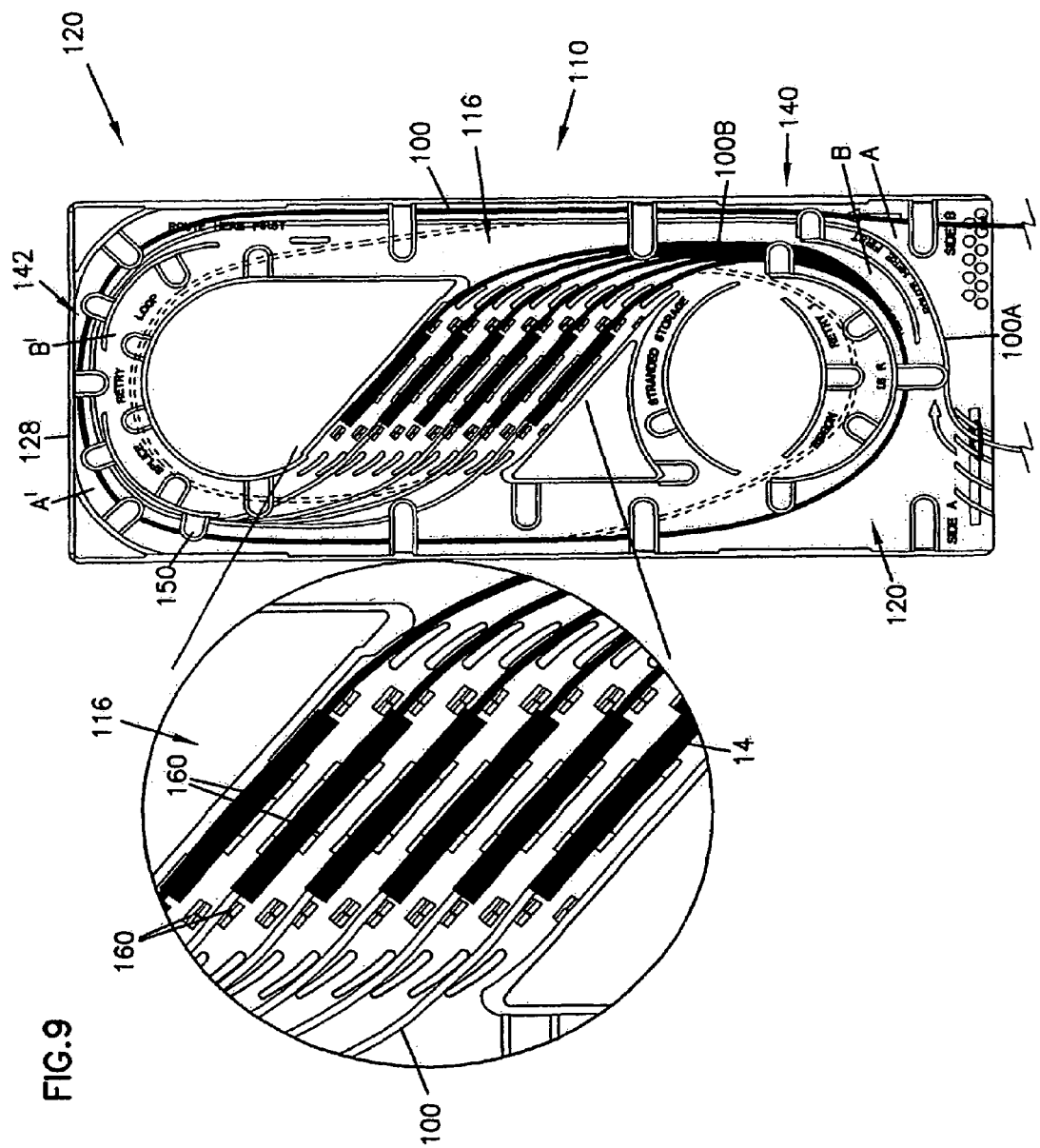
FIG. 9 is a top plan view, with detail, of the splice tray of FIG. 8, shown in use with ribbon cable.

For example, FIG. 5 illustrates the splice tray 10 in use with fiber optic ribbon cables 100. For purposes of clarity, only one ribbon cable 100 is shown, although the splice holding arrangement 16 is designed to hold six ribbon splice components 14 and cables 100 (as shown in FIG. 9). The ribbon cable 100 enters and exits through the open end 36 of the splice tray 10. In particular, a first incoming length or portion 100A (represented by a bold, thin line) of the ribbon cable 100 enters at the entrance location 68 located at the open end of the splice tray 10. A second outgoing length or portion 100B (represented by a bold, thick line) of the ribbon cable exits at the exit location 70 at the open end of the tray. Similar to the previous embodiment, a lancing, tie, or other securing device 76 can be placed through the slot 74 and aperture(s) 78 to secure the ribbon cables 100 at the entrance and exit locations 68, 70 of the tray 10.

When organizing or filling the splice tray 10 with ribbon cables 100, the incoming cable length 100A of each of the cables 100 enters at the entrance location 68 and is routed through the first and second radius limiting arrangements 40, 42 in a counter-clockwise direction. In particular, the cable length 100A is routed around the outer radius element 81 (i.e, within a portion of the first segment A of the outer pathway) of the first radius limiting arrangement 40 in a counter-clockwise direction. The cable length 100A then runs within the outer pathway adjacent to the side 31 of the splice tray 10 and through the second segment A' of the outer pathway.

From the second segment A' of the outer pathway, the first incoming cable length 100A is fed through the curved fingers 62 and into one of the channels 58 of the splice holding arrangement 16. A ribbon splice component 14 is used to join the first incoming cable length 100A and the second outgoing cable length 100B.

The second outgoing cable length 100B exits the curved fingers 64 of the splice holding arrangement 16 and is routed through the first and second radius limiting arrangements 40, 42 in a clockwise direction. Depending upon the amount of slack desired or available, the outgoing cable length 100B can be routed through either the first segment A of the outer pathway, the first segment B of the first inner pathway, or the segment C of the second inner pathway.

In the illustrated routing scheme of FIG. 5, the outgoing ribbon cable length 100B is run through the first segment A of the outer pathway of the first radius limiting arrangement 40, and then through the second segment A' of the outer pathway of the second radius limiting arrangement 42. From the second segment A' of the outer pathway, the ribbon cable 100 is routed along the side 31 of the tray 10, and exits the tray at the exit location 70. As shown in FIG. 4, the outgoing ribbon cable length 100B is routed both inside the incoming ribbon cable length 100A when coming from the splice holding arrangement 16, and outside of the incoming ribbon cable length 100A when coming from the second outer pathway segment A', without crossing over the incoming cable length 100A.

Unlike the previous embodiment, the outgoing ribbon cable length 100B cannot be routed around the stranded storage segment, as doing so would required that the ribbon cable cross over itself. Nonetheless, the present storage arrangement 20 of the splice tray 10 still accommodates storage and use of slack ribbon cable.

In particular, if a slack portion of the incoming cable length 100A is needed, the cable length or loop 100A can be removed from the second segment A' of the outer pathway, a portion of the cable loop 100A utilized, and the remaining cable loop (now shorted) returned to the shorter intermediate pathway, i.e., segment B' (represented by thin dashed line 106). In the alternative, if it is desirable to utilize a portion of the outgoing cable length 100B, the cable length or loop 100B can be removed from the first segment A of the outer pathway, a portion of the cable loop 100B utilized, and the remaining cable loop (now shorted) returned to either segment B of the first inner pathway or segment C of the second inner pathway (represented by thick dashed line 108).

Figure 6:
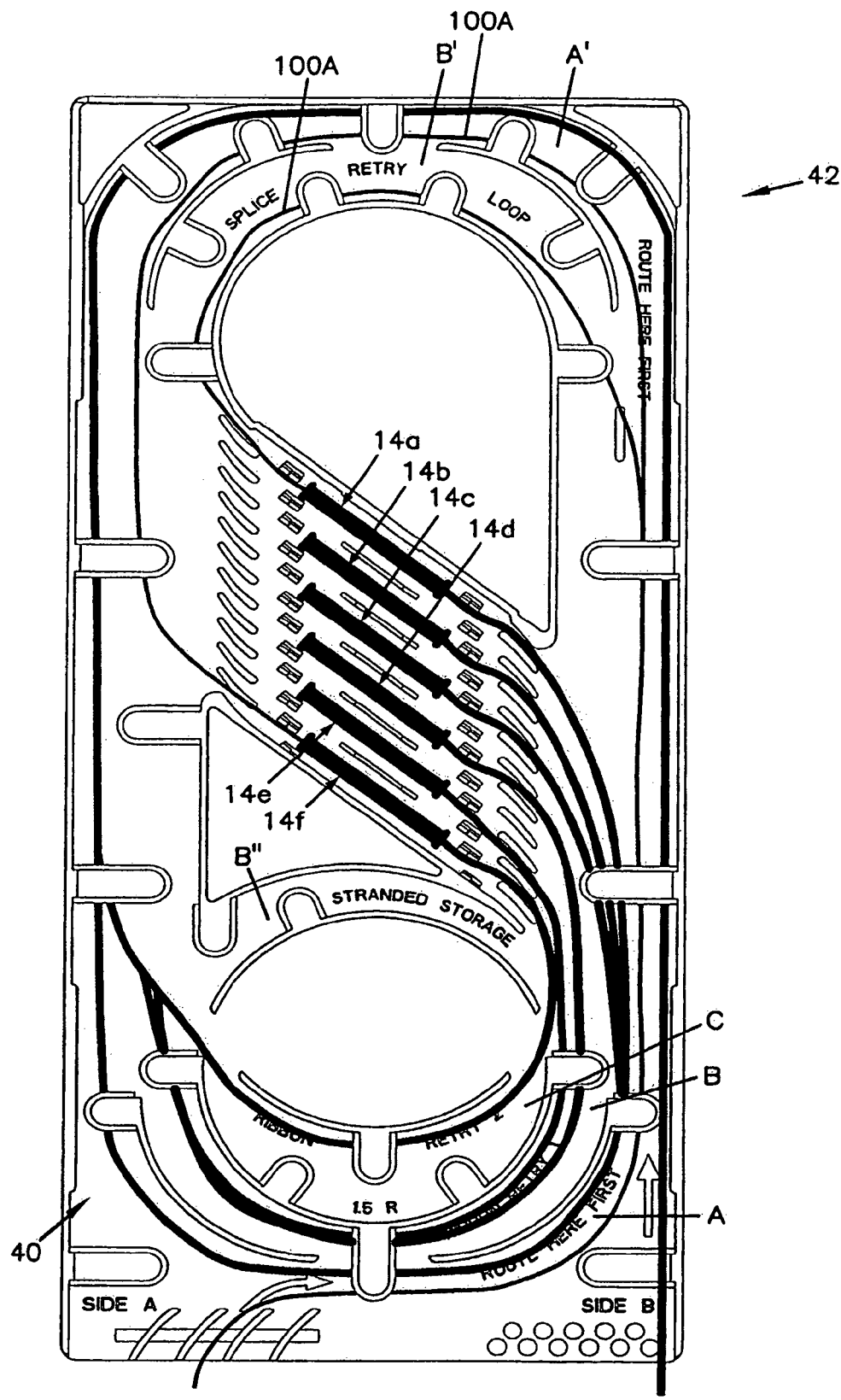
FIG. 6 is a top plan view of the splice tray of FIG. 5, showing one of many routing schemes of ribbon cable.

Referring now to FIG. 6, one routing schematic of multiple ribbon cables 14 is illustrated. The multiple ribbon cables are each associated with ribbon splice components, including an uppermost splice component 14a, middle splice components 14b-14e, and a lowermost splice component 14f.

As can be understood, when utilizing slack of the incoming cable length 100A (only two shown) associated with the uppermost splice component 14a, no portion of the utilized or shortened cable crosses over any of the other cables when the shortened incoming cable is returned to storage in the first inner pathway (segment B'). Likewise, generally, when utilizing slack of the outgoing cable length 100B associated with the lowermost splice component 14f, no portion of the utilized or shortened cable crosses over any of the other cables when the shortened cable is returned to storage in one of the first and second inner pathways (segment B, C).

To ensure none of the ribbon cables cross one another, when utilizing slack from the outgoing cable length, for example, associated with any of the middle splice components 14b-14e, each of the other ribbon cables descending in order, and not already correspondingly shortened, is typically reordered and rerouted in both the first and second cable limiting arrangements 40, 42. Similarly, if slack from the incoming cable length 100A of any of the middle ribbon cables is utilized, each of the other ribbon cables ascending in order is typically reordered and rerouted in both the first and second cable limiting arrangements so that no portion of the shortened cable 100A crosses over other non-shortened ribbon cables.

For example, in the illustrated routing of FIG. 6, the first three splice components 14a-14c are each routed within the outer pathway. The fourth and fifth splice components 14d, 14e are routed with the first inner pathway, and the sixth splice component 14f is routed within the second inner pathway. If the outgoing slack cable 100B associated with the fourth splice component 14d were to be utilized and shorted to run within the second inner pathway, the cable and the associated splice component 14d would be re-grouped with the other splice components and cables currently running in that particular shortened pathway (e.g. re-grouped to run with splice component 14f in the second inner pathway B). That is, the cable and associated splice component 14d would be switched in order with splice component 14e, and the associated cable portion 100B rerouted with the shortened cable portion of 14f so that no portion of the shortened cable (14d) crosses over other non-shortened ribbon cables (14e).

Conventional splice tray arrangements typically require a technician to reroute the entire tray if ribbon cable repairs are needed. The present arrangement provides shortened storage pathways within which to route shortened repaired ribbon cable, and permits utilization of the stored slack ribbon cable, while not necessarily requiring the technician to reroute all the ribbon cables in the tray.

Figure 7:
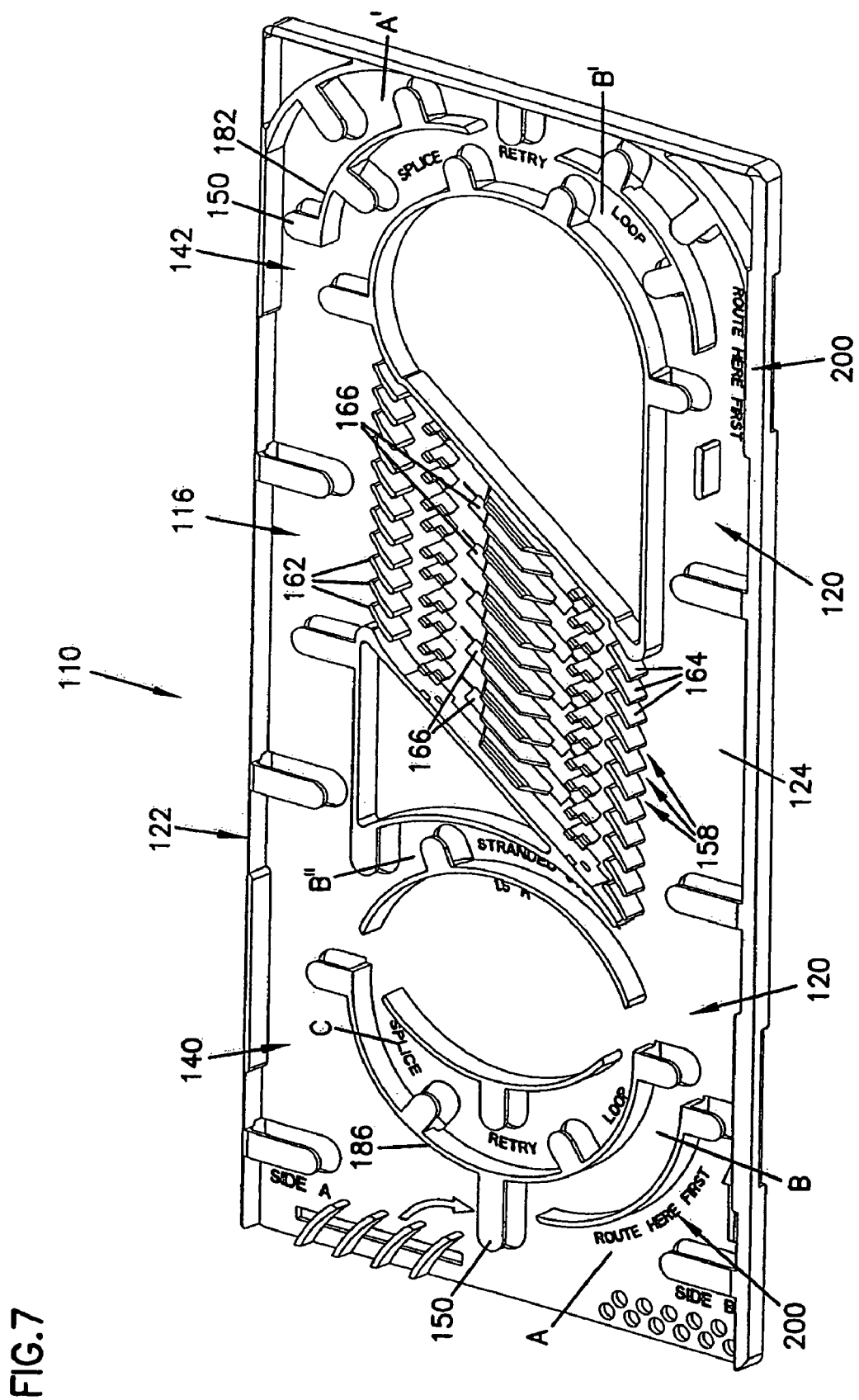
FIG. 7 is a perspective view of another embodiment of a splice tray, according to the principles of the present disclosure.
Figure 8:
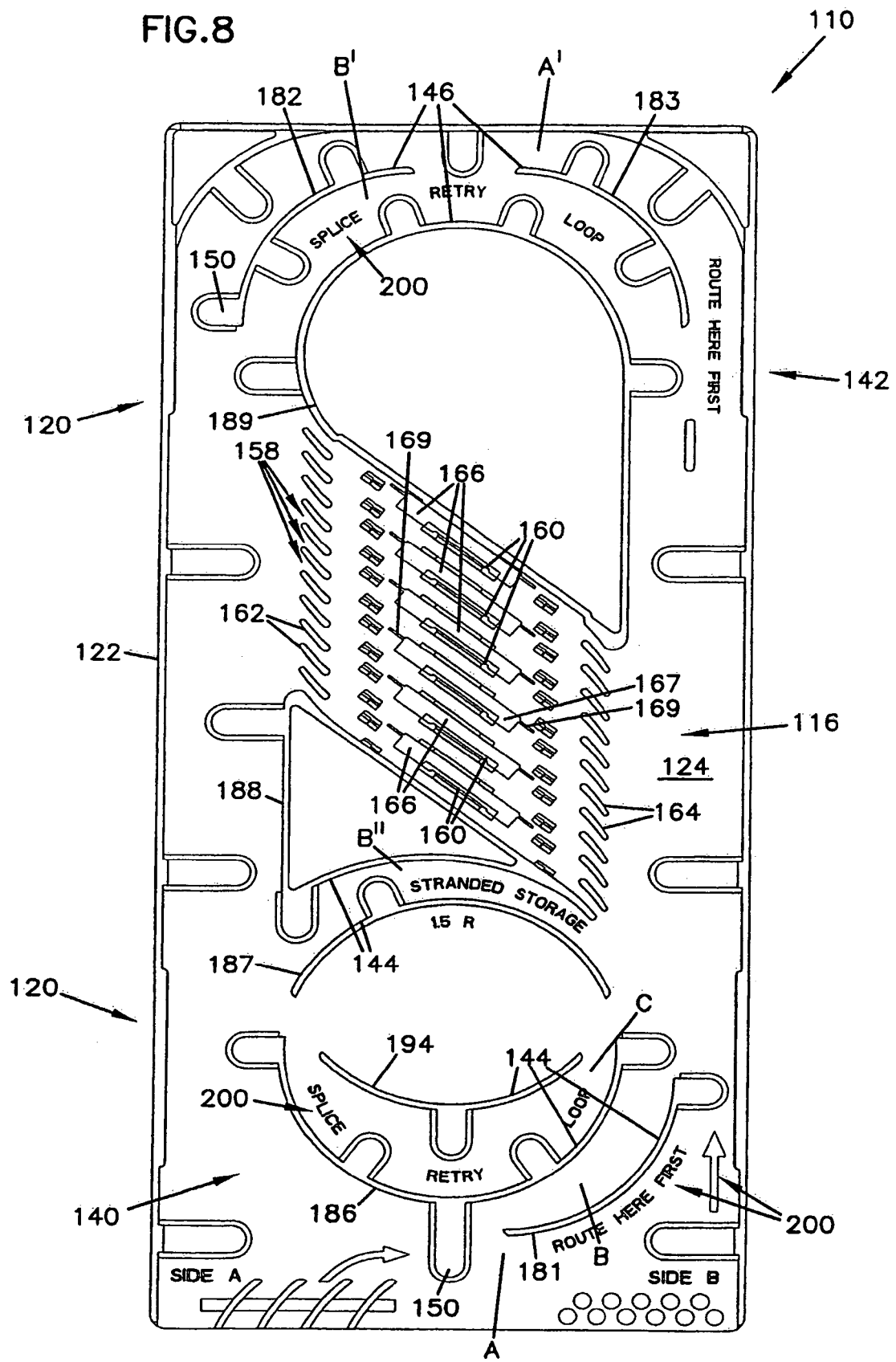
FIG. 8 is a top plan view of the splice tray of FIG. 7.

Referring now to FIGS. 7-9, a second embodiment of a splice tray 110 is illustrated. Similar to the previous embodiment, the splice tray 110 includes a splice holding arrangement 116 and a storage arrangement 120, each integrally formed with or molded on a generally planar surface 124 of a base 122.

The storage arrangement 120 for storing slack cable of the splice tray 110 includes a first radius limiting arrangement 140 and a second radius limiting arrangement 142. The first radius limiting arrangement 140 includes a first plurality of radius elements 144 (FIG. 8); and the second radius limiting arrangement 142 includes a second plurality of radius elements 146. Like the previous embodiment, the first and second radius limiting arrangements 140, 142 define an outer pathway (including segments A and A' defined by radius elements 181-183), a first inner pathway (including segments B and B' defined by radius elements 186 and 189), a second inner pathway (including segment C defined by radius element 194), and a spooling pathway (including segment B" defined by radius elements 187 and 188).

The radius elements 144, 146 that define the pathways of the storage arrangement 120 are arranged and constructed as described with respect to the first embodiment, with the exception that one outer radius element is not provided (i.e., radius element 80 of the first splice tray embodiment (FIG. 3)). The routing scheme for this tray embodiment 110 is similar to the previous embodiment, except that outgoing cables (e.g., 100B, FIG. 9) exiting the splice holding arrangement 116 are all routed through the first inner pathway (segment B) of the first radius limiting arrangement 140, and then through the outer pathway (segment A') of the second radius limiting arrangement 142.

Each of the radius elements 144, 146 of the radius limiting arrangements 140, 142 includes one or more tabs 150. In the embodiment of FIGS. 7-9, an additional tab 150 is added to radius element 182, in comparison to the first splice tray embodiment 10 of FIGS. 1-6. Also, a middle tab 150 extending from radius element 186 is greater in length than the respective tab of radius element 86 in the previous embodiment to accommodate a greater number of cables utilized in some applications.

Similar to the previous embodiment, the splice holding arrangement 116 preferably holds two types of splice components (e.g. 12, 14) so that the splice tray can be used to house either fiber optic ribbon cables or fiber optic stranded cables. In use, each type of cable includes a first incoming cable length (e.g., 100A, FIG. 9) joined to a second outgoing cable length (e.g., 100B, FIG. 9) by a splice component (e.g., 14, FIG. 9). The splice tray 110 manages and organizes the incoming and outgoing lengths of either stranded cable 90 (e.g., FIG. 4) or ribbon cable 100 (e.g., FIG. 9), as previously described. A representative routing scheme for use with ribbon cables 100 is shown in FIG. 9.

Referring back to FIG. 8, the splice holding arrangement 116 of the splice tray 110 is positioned between the first and second radius limiting arrangements 140, 142. The splice holding arrangement 116 includes a plurality of slots or channels 158 within which the splice components (e.g., 12, 14) are placed and held. The channels 158 are defined by retaining structure 160 and curved fingers 162, 164 located at opposite ends of the retaining structure 160. The splice holding arrangement 116 in this embodiment includes recesses or indents 166 formed or molded in the planar surface 124 of the base 122. The indents 166 are located between the retaining structure 160 that define the channels 158 of the holding arrangement 116.

Referring to FIGS. 8 and 9, the indents 166 assist a technician in properly orienting the ribbon splice components 14 when used for storing ribbon cables 100. In particular, the indents 166 include a body portion 167 (FIG. 8) and tail portions 169 (FIG. 8) that indicate to the technician that the ribbon cable 100 (FIG. 9) extending from the ribbon splice component 14 should be placed in the shown orientation (i.e., with the extending ribbon cable located toward a second end 128 of the tray 110). This orientation prevents interference that may otherwise result between the ribbon cable 100 and the retaining structure 160 of the splice holding arrangement 116 (see detail view of FIG. 9).

Referring back to FIG. 8, the curved fingers 162, 164 of the splice holding arrangement 116 have a shortened length in comparison to the previous embodiment. The shortened fingers 162, 164 better accommodate longer stranded splice components, such as 60 mm splice components in comparison to 40 mm splice components. The shortened fingers better protect the fibers of longer stranded splice components from being pinched or exceeding the minimum bend radius as the cable exits/enters the splice holding arrangement 116.

The present storage arrangements 20, 120 of the disclosed splice trays 10, 110 neatly, and in an organized manner, manage and store both stranded fiber optic cables and ribbon fiber optic cables. To further improve upon the ease and convenience of use of the disclosed splice trays, the trays 10, 110 include routing instructions formed directly in the base during the molding process. Forming the instruction directly in the base can eliminate the need for a separate routing diagram that can be lost or misplaced. The routing instructions 200 can include text and other orienting or directional markings that provide the technician information on how and where to route the incoming and outgoing cable lengths in the tray.

In the illustrated embodiments of FIGS. 3 and 7, the routing instructions 200 includes text indicating where to first route the incoming cable lengths for each of the cables, whether ribbon or stranded 100, 90. The text directs the technician to route the incoming cable length through the outer pathway (segments A, A') first. The routing instructions 200 also includes text indicating where to route the slack stranded cable, and where to route shortened cable slack (i.e., ribbon retry or splice retry loop). The directional markings of the routing instructions 200 can include arrows shown adjacent to the first end 26 (FIG. 3) of the base 22, the orienting indents 166 (FIG. 9) shown at the splice holding arrangement 116, or other indicia that assists the technician in properly arranging the cables within the splice tray 10, 110.

The integral routing information formed in the tray base eliminates the need for a separate schematic diagram, and further improves upon the ease and convenience of use of the presently disclosed splice trays.

The above specification provides a complete description of the invention. Since many embodiments of the invention can be made without departing from the spirit and scope of the invention, certain aspects of the invention reside in the claims hereinafter appended.

What is claimed is:

1. A method of repairing a spliced cable within a splice tray having a plurality of spliced cables, the splice tray including a splice holding arrangement and a storage arrangement, each cable of the plurality of spliced cables including an incoming cable length and an outgoing cable length interconnected by a splice component, the splice component being held by the splice holding arrangement, the incoming cable length and the outgoing cable length being routed within the storage arrangement, the method of repairing the spliced cable comprising the steps of:

a) removing at least one of the incoming cable length and the outgoing cable length of a spliced cable from an outer cable loop;
   b) utilizing a portion of the at least one cable length, wherein utilizing the portion results in a shortened cable length; and
   c) routing the shortened cable length within an inner cable loop without crossing over other spliced cable lengths.

2. The method of claim 1, wherein the step of removing at least one of the incoming cable length and the outgoing cable length includes removing the outgoing cable length, and wherein the step of routing the shortened outgoing cable length includes routing the shortened outgoing cable length within one of two different inner slack loops.

3. The method of claim 1, further including replacing the splice component of the splice cable, the splice component being a ribbon splice component.

4. The method of claim 1, further including replacing the splice component of the splice cable, the splice component being a stranded splice component.

5. The method of claim 1, wherein the step of routing the shortened cable length includes routing the shortened cable length about a spooling structure of the storage arrangement.

6. The method of claim 1, further including re-ordering the splice component of one or more spliced cables within the splice holding arrangement such that the spliced cables are grouped by length.

7. The method of claim 6, wherein the step of re-ordering includes reordering only a first splice component of a first spliced cable with a second splice component of a second spliced cable.

8. The method of claim 6, wherein the step of re-ordering the splice component of one or more spliced cables includes re-ordering the splice component of the shortened spliced cable and only one of:

i) one or more splice components descending in order from the splice component of the shortened spliced cable; and
   ii) one or more splice components ascending in order from the splice component of the shortened spliced cable.

* * * * *